United States Patent
Shimizu et al.

(10) Patent No.: US 7,226,199 B2
(45) Date of Patent: Jun. 5, 2007

(54) LIGHTING UNIT AND LIQUID CRYSTAL DISPLAY DEVICE USING THE UNIT

(75) Inventors: Makoto Shimizu, Kanazawa (JP); Yoshinori Yasuda, Ishikawa-gun (JP); Toshihiko Ura, Nomi-gun (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 443 days.

(21) Appl. No.: 10/491,729

(22) PCT Filed: Oct. 7, 2002

(86) PCT No.: PCT/JP02/10404

§ 371 (c)(1),
(2), (4) Date: Sep. 21, 2004

(87) PCT Pub. No.: WO03/031870

PCT Pub. Date: Apr. 17, 2003

(65) Prior Publication Data

US 2005/0018415 A1    Jan. 27, 2005

(30) Foreign Application Priority Data

Oct. 5, 2001    (JP)    ............................. 2001-309593

(51) Int. Cl.
F21V 8/00    (2006.01)

(52) U.S. Cl. ...................... 362/609; 362/608; 362/621; 362/26

(58) Field of Classification Search ................ 362/608, 362/609, 611, 614, 26, 27, 615, 621–623, 362/632; 349/65
See application file for complete search history.

(56) References Cited

U.S. PATENT DOCUMENTS

| 5,788,356 | A  | * | 8/1998  | Watai et al. ................ 362/621 |
| 6,419,369 | B1 | * | 7/2002  | Itoh ............................ 362/26 |
| 6,435,685 | B2 | * | 8/2002  | Matsushita ................... 362/608 |
| 6,811,276 | B2 | * | 11/2004 | Moon .......................... 362/600 |
| 7,118,266 | B2 | * | 10/2006 | Matsushita .................. 362/609 |

FOREIGN PATENT DOCUMENTS

| JP | 08-327828  | 12/1996 |
| JP | 2001-126523 | 5/2001 |

* cited by examiner

Primary Examiner—Laura K. Tso
(74) Attorney, Agent, or Firm—McDermott Will & Emery LLP (57) ABSTRACT

A lighting unit of the present invention includes a light guiding plate (3), a light source (2) disposed so as to face an end face of the light guiding plate, a reflector (4) disposed so as to surround the light source, a housing (6) disposed so as to have a light guiding plate-retaining portion (6a) that retains at least the reflector and is partially interposed between the light source and the end face of the light guiding plate so as to retain the light guiding plate, and a reflecting sheet (5) disposed on one of principal surfaces of the light guiding plate, the lighting unit being configured such that light from the light source enter into the end face of the light guiding plate and goes out from another principal surface of the light guiding plate. The reflecting sheet is disposed so that an edge portion (5a) is bent so as to be positioned between the light guiding plate-retaining portion of the housing and the end face of the light guiding plate.

5 Claims, 6 Drawing Sheets

LIGHTING UNIT AND LIQUID CRYSTAL DISPLAY DEVICE USING THE UNIT

TECHNICAL FIELD

The present invention relates to a lighting unit used for liquid crystal display devices or the like and a liquid crystal display device using the unit.

BACKGROUND ART

In recent years, by taking advantage of such features as light weight, small thickness, and low power consumption, liquid crystal display devices have been widely used for display devices in information devices such as notebook-type personal computers and word processors, or for display devices in video devices such as portable televisions, camcorders, and vehicle navigation systems. In order to realize a bright display screen, many of these liquid crystal display devices have such a configuration that illuminating light is applied from the rear of a display element by a built-in lighting unit.

For this lighting unit, an edge light system, in which a light guiding plate is placed on the rear of a display element (liquid crystal display panel) and a line light source of a fluorescent discharge tube or the like is disposed on an end face of the light guiding plate, is advantageous in thickness reduction and brightness uniformity across the light-emitting surface. Accordingly, in many cases the edge light system is adopted for the backlight system of a liquid crystal display device used for notebook-type personal computers or the like since a smaller thickness is given a priority. In addition, a liquid crystal display device used for portable televisions, vehicle navigation systems, or the like, adopts in many cases an edge light system in which light sources are arranged on four end faces or two end faces of a rectangular-shaped light guiding plate in order to obtain both brightness and small thickness.

Figure 5:
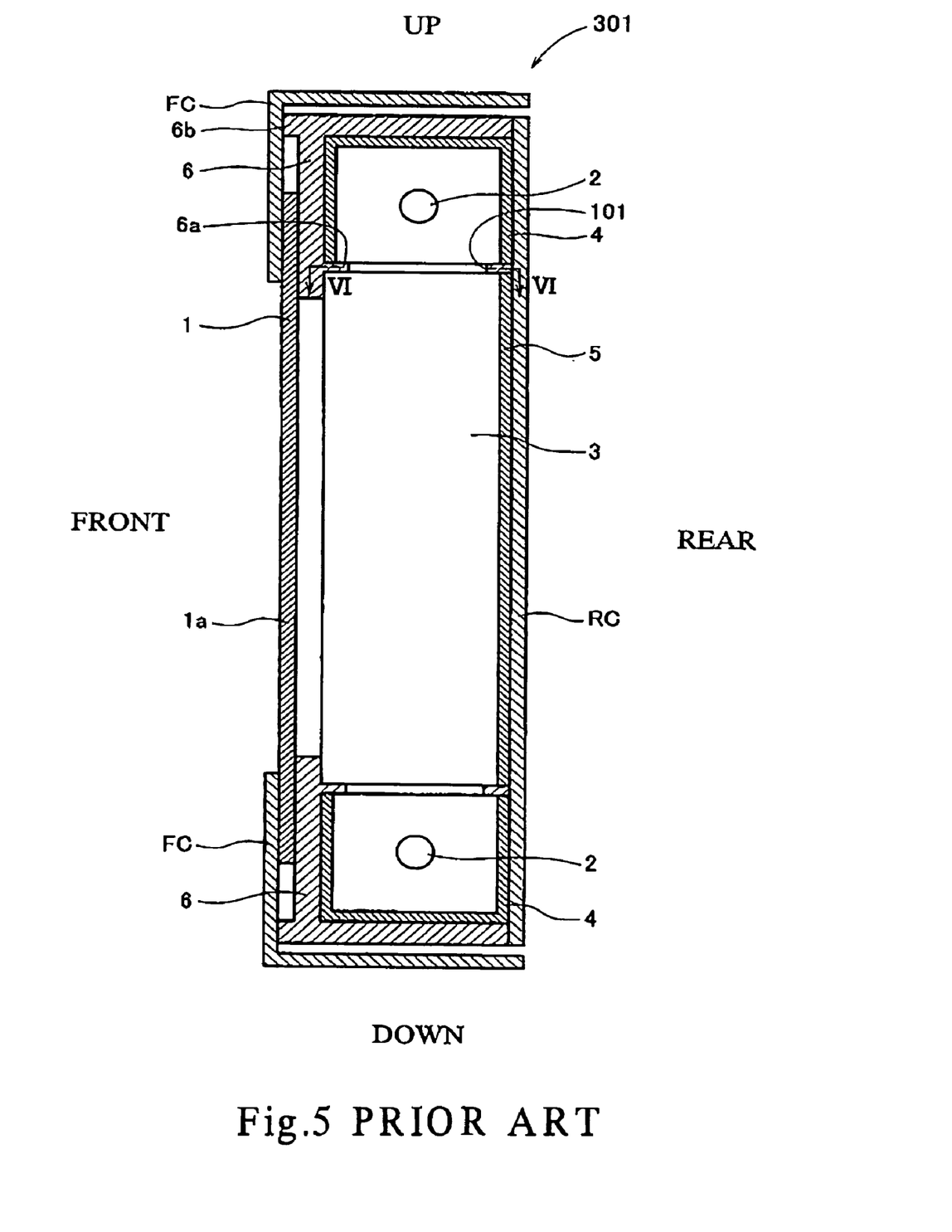
FIG. 5 is a cross-sectional view showing the configuration of a conventional edge-light type lighting unit and a liquid crystal display device using the same.
Figure 6:
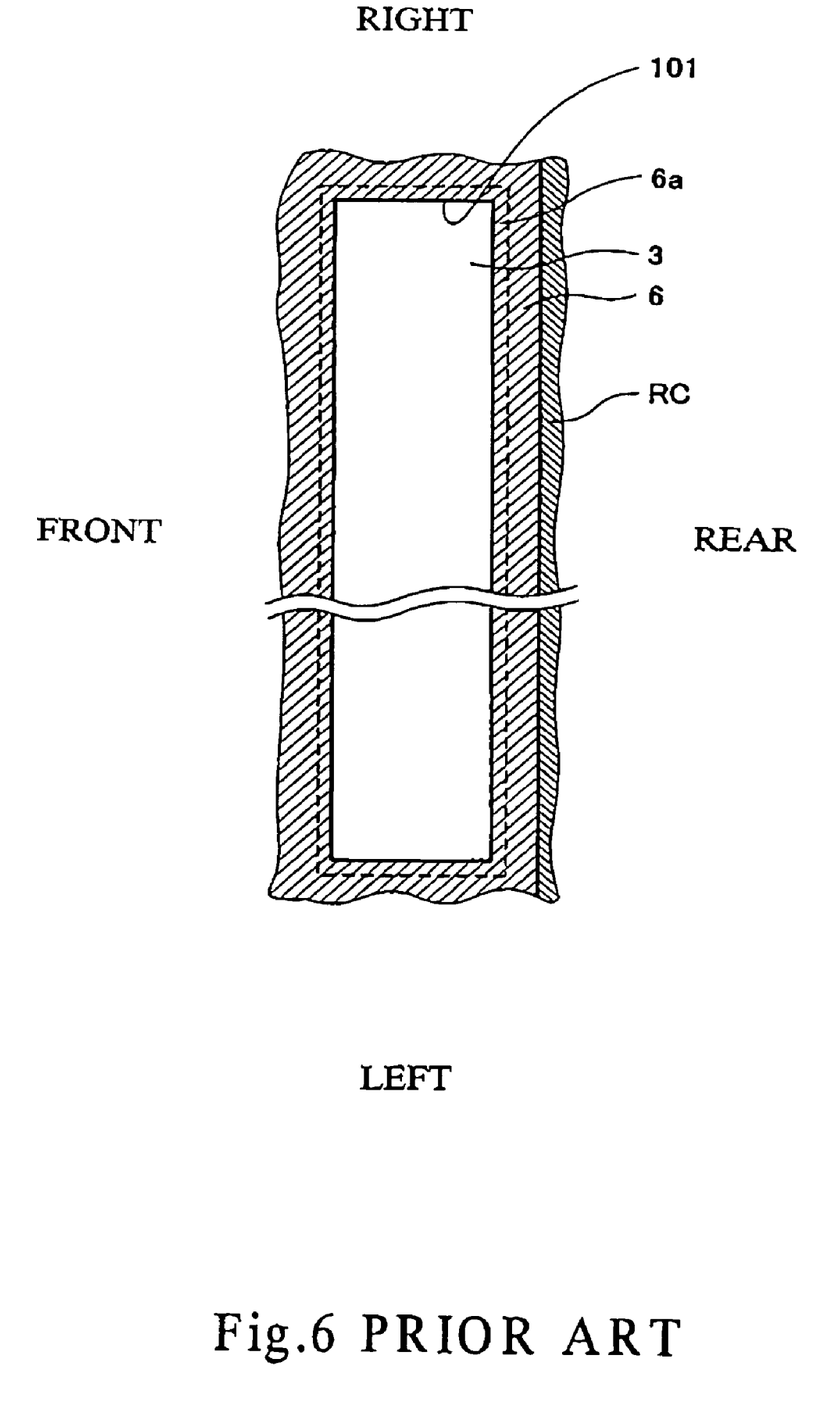
FIG. 6 is a cross-sectional view taken along line VI—VI of FIG. 5.

FIG. 5 is a cross-sectional view showing the configuration of a conventional edge-light type lighting unit and a liquid crystal display device using the same, and FIG. 6 is a cross-sectional view taken along line VI—VI of FIG. 5. In FIG. 5, a liquid crystal display device 301 is oriented as shown in the figure according to the conditions of use.

Referring to FIG. 5, this liquid crystal display device 301 has a transparent light guiding plate 3, shaped like a rectangular flat panel, that transmits light in a direction parallel to a principal surface. On the rear face of the light guiding plate 3, a reflecting sheet 5 is disposed. Further, respective light sources 2 are arranged along the upper end face and the lower end face of the light guiding plate 3. That is, this lighting unit adopts an edge light system in which light sources are arranged on two opposing end faces. In addition, respective reflectors 4 having a substantially U-shaped cross section are arranged so as to surround this pair of light sources 2. The light sources 2, the light guiding plate 3, the reflectors 4, and the reflecting sheet 5 constitute a lighting unit.

Additionally, a rear cover RC is disposed so as to be in contact with the rear faces of the reflecting sheet 5 and the reflectors 4, and respective housings 6 are disposed on the upper and lower ends of this rear cover RC. The housing 6 is disposed so as to surround the end face and the front face of the reflector 4 and the edge portion of the front face of the light guiding plate 3 and to retain the light guiding plate 3 by being partially interposed between the reflector 4 and the light guiding plate 3. These portions 6a that retain the light guiding plate 3 (hereafter referred to as "light guiding plate-retaining portions") each have a rectangular window portion 101 in the middle, as shown in FIG. 6. The rear cover RC and the pair of housings 6, 6, arranged on upper and lower ends of the rear cover RC, constitute a case of the liquid crystal display device 301.

A protruding portion 6b is formed on an edge of each front face of the pair of housings 6, 6, and a liquid crystal display panel (liquid crystal display element) 1 is disposed so as to span between the front faces of the two housings 6, 6. In addition, a pair of front frames FC are disposed so as to be in contact with the protruding portions 6b of the respective housings 6 and to cover end faces of the housings 6 and edge portions of the liquid crystal display panel 1. This pair of front frames FC constitute a cover portion of the case of the liquid crystal display device 301. The liquid crystal display device 301 also incorporates a driver circuit, which is not shown in the figure, for the liquid crystal display panel 1.

The light guiding plate 3 is formed of a material such as an acrylic resin. The reflector sheet 5 is formed by, for example, a film made of a light-reflective white resin. The housing 6 is composed of, for example, a polycarbonate resin.

In the liquid crystal display device 301 thus configured, although thin, the light source 2 and the reflector 4 are retained by the housings 6 and the light guiding plate 3 is suitably retained by the light guiding plate-retaining portions 6a.

The light emanating from the light sources 2 passes through the window portions 101 of the light guiding plate-retaining portions 6a of the housings 6 and enters the end faces of the light guiding plate 3 either directly or with it being reflected by the reflectors 4; then it propagates in the light guiding plate 3 and emanates from its front face. During this process, the light that leaks from the rear face of the light guiding plate 3 is returned into the light guiding plate 3 by the reflecting sheet 5. In addition, scattering dots are provided on the rear face of the light guiding plate 3 at densities corresponding to the distances from the light source 2, whereby the distribution of intensity of the light emanating from the light guiding plate 3 becomes uniform. The light emanating from the light guiding plate 3 passes through the liquid crystal display panel 1, where the transmittance thereof is controlled by the driver circuit according to an image signal, and thereby an image is displayed on a display screen 1a of the liquid crystal display panel 1.

This thin-type liquid crystal display device 301, however, suffers from brightness unevenness such that the light guiding plate-retaining portions 6a block the light that is to enter the end faces of the light guiding plate 3, causing the portions where the light is blocked to appear as dark shades on the display screen 1a. This is particularly conspicuous in an edge light system in which the light sources 2 are arranged in a substantially L-shape along two adjoining end faces of the light guiding plate 3. The reason is that, due to the shape of the light guiding plate-retaining portion 6a of the housing 6, a large proportion of the light that is to enter the light guiding plate 3 is blocked by the light guiding plate-retaining portion 6a.

DISCLOSURE OF INVENTION

An object of the present invention is to provide a lighting unit that is capable of reducing brightness unevenness attributed to the housing, and a liquid crystal display device using the same.

In order to accomplish this object, the present invention provides a lighting unit comprising a light guiding plate, a light source disposed so as to face an end face of the light guiding plate, a reflector disposed so as to surround the light source, a housing disposed so as to have a light guiding plate-retaining portion retaining at least the reflector and being partially interposed between the light source and the end face of the light guiding plate to retain the light guiding plate, and a reflecting sheet disposed on one of principal surfaces of the light guiding plate, the lighting unit being configured so that light from the light source enters into the end face of the light guiding plate and goes out from another principal surface of the light guiding plate, wherein the reflecting sheet is disposed so that an edge thereof is bent so as to be positioned between the light guiding plate-retaining portion of the housing and the end face of the light guiding plate.

When this configuration is adopted, the light scattered in the light guiding plate is reflected by a portion of the reflecting sheet positioned between the light guiding plate-retaining portion of the housing and the end face of the light guiding plate and is consequently emanated from the other principal surface of the light guiding plate; therefore, the brightness unevenness attributed to the housing of the liquid crystal display device can be reduced.

It is preferable that the bend portion of the reflecting sheet has a reflectivity lower than the reflectivity of the remaining portions.

When this configuration is adopted, it is possible to reduce the bright line-like brightness unevenness due to specular reflection in the bend portion of the reflecting sheet.

Alternatively, a lighting unit according to the invention comprises a light guiding plate, a light source disposed so as to face an end face of the light guiding plate, a reflector disposed so as to surround the light source, a housing disposed so as to have a light guiding plate-retaining portion retaining at least the reflector and being partially interposed between the light source and the end face of the light guiding plate to retain the light guiding plate, and a reflecting sheet disposed on one of principal surfaces of the light guiding plate, the lighting unit configured so that light from the light source enters into the end face of the light guiding plate and goes out from another principal surface of the light guiding plate, wherein a surface of the light guiding plate-retaining portion of the housing that faces the end face of the light guiding plate is capable of reflecting incident light.

When this configuration is adopted, the light scattered in the light guiding plate is reflected by the surface of the light guiding plate-retaining portion of the housing that faces the end face of the light guiding plate, and is consequently emanated from the other principal surface of the light guiding plate; therefore, the brightness unevenness attributed to the housing of the liquid crystal display device can be reduced.

Alternatively, a lighting unit according to the invention comprises a light guiding plate, a light source disposed so as to face an end face of the light guiding plate, a reflector disposed so as to surround the light source, a housing disposed so as to have a light guiding plate-retaining portion retaining at least the reflector and being partially interposed between the light source and the end face of the light guiding plate to retain the light guiding plate, and a reflecting sheet disposed on one of principal surfaces of the light guiding plate, the lighting unit being configured so that light from the light source enters into the end face of the light guiding plate and goes out from another principal surface of the light guiding plate, wherein the end face of the light guiding plate that is opposed to the light guiding plate-retaining portion of the housing is capable of reflecting incident light into the light guiding plate.

When this configuration is adopted, the light scattered in the light guiding plate is reflected by the surface of the end face of the light guiding plate that is opposed to the light guiding plate-retaining portion of the housing and is consequently emanated from the other principal surface of the light guiding plate; therefore, the brightness unevenness attributed to the housing of the liquid crystal display device can be reduced.

Alternatively, a liquid crystal display device according to the present invention uses a lighting unit according to any one of claims 1, 3, and 4 as a lighting unit for supplying light for display to a liquid crystal panel.

When this configuration is adopted, the distribution of intensity of the light emanating from the lighting unit is such that the brightness unevenness attributed to the housing can be reduced, as described above, and therefore, the brightness unevenness attributed to the housing can be reduced in a desirable manner.

The foregoing and other objects, features and advantages of the present invention will become more readily apparent from the following detailed description of preferred embodiments of the invention, with reference to the accompanying drawings.

BEST MODE FOR CARRYING OUT THE INVENTION

Hereinbelow, embodiments of the present invention are described with reference to the drawings.

Embodiment 1

Figure 1:
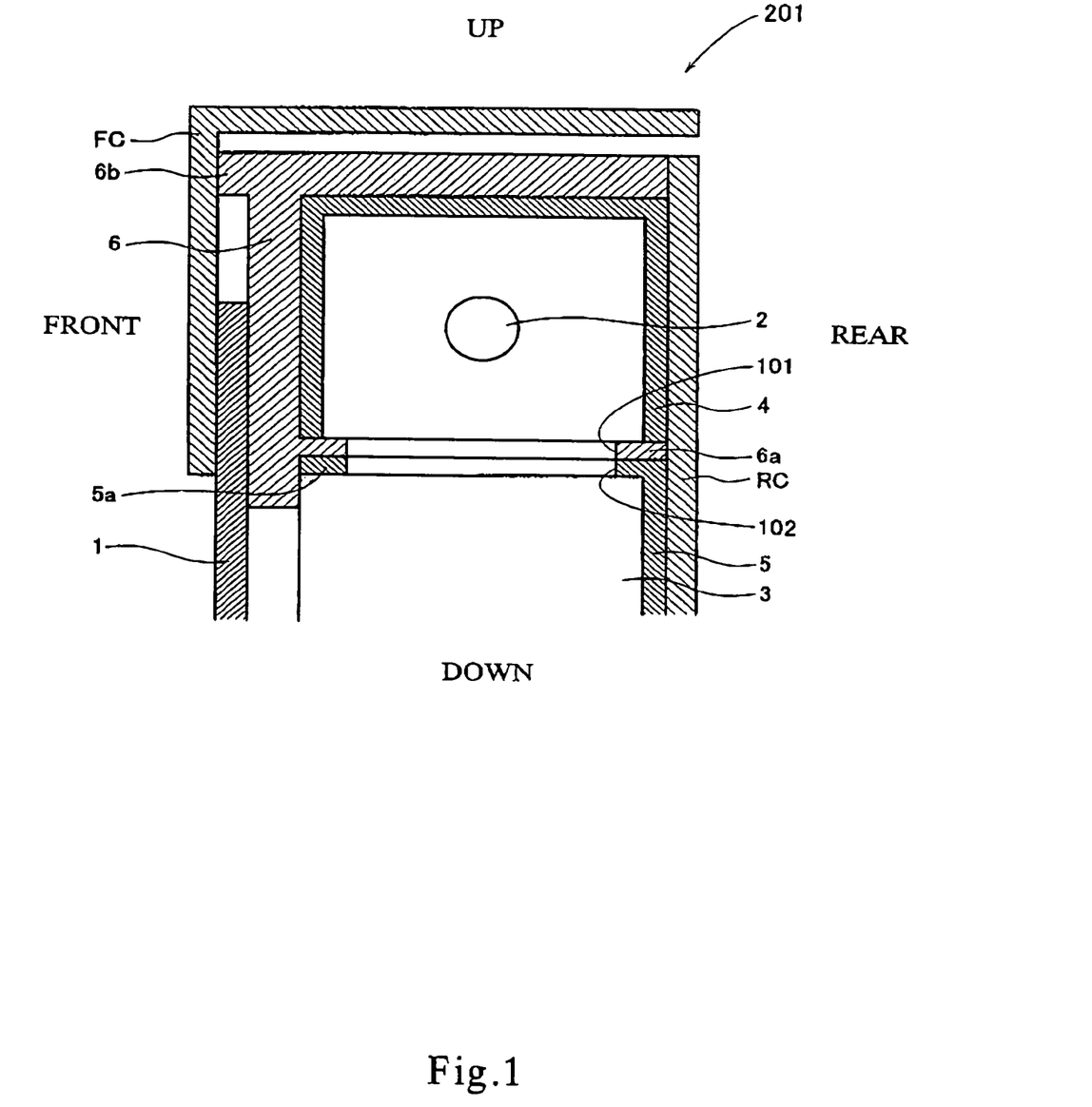
FIG. 1 is a cross-sectional view showing the configuration of a primary portion of a lighting unit and a liquid crystal display device using the same, according to Embodiment 1 of the present invention.

FIG. 1 is a cross-sectional view showing the configuration of a primary portion of a lighting unit and a liquid crystal display device using the same, according to Embodiment 1 of the present invention.

The overall configuration of the lighting unit and the liquid crystal display device according to the present embodiment is similar to those of the conventional example illustrated in FIGS. 5 and 6. For this reason, FIG. 1 depicts only a portion that includes a characteristic configuration of the present invention.

Referring to FIG. 1, a liquid crystal display device 201 according to the present embodiment has a transparent light guiding plate 3, shaped like a rectangular flat panel, that transmits light in a direction parallel to a principal surface. On the rear face of the light guiding plate 3, a reflecting sheet 5 is disposed. Further, respective light sources 2 are disposed along the upper end face and the lower end face of the light guiding plate 3. Respective reflectors 4 having a substantially U-shaped cross section are disposed so as to surround this pair of light sources 2. The light sources 2, the light guiding plate 3, the reflectors 4, and the reflecting sheet 5 constitute a lighting unit. Additionally, a rear cover RC is disposed so as to be in contact with the rear face of the reflecting sheet 5 and the reflectors 4, and respective housings 6 are disposed on the upper and lower ends of this rear cover RC. Each housing 6 is disposed in such a manner that it surrounds an end face and the front face of the reflector 4 and an edge of the front face of the light guiding plate 3 and that a light guiding plate-retaining portion 6a is partially interposed between the reflector 4 and the light guiding plate 3 so as to retain the light guiding plate 3. This light guiding plate-retaining portion 6a has, as clearly seen from FIG. 6, a rectangular window portion 101 in the middle. The rear cover RC and the pair of housings 6, 6, arranged on upper and lower ends of the rear cover RC, constitute an case of the liquid crystal display device 201. Here, in the present embodiment, as its characteristic feature, both edge portions (only the upper edge portion of which being shown in FIG. 1, and hereafter referred to as a "bend portions") 5a of the reflecting sheet 5 are bent so that they are interposed between the two end faces of the light guiding plate 3 (only the upper end face of which being shown in FIG. 1) and the light guiding plate-retaining portions 6a of the housings 6. The bend portion 5a of the reflecting sheet 5 is provided with a window portion 102 so as to correspond to the window portion 101 of the light guiding plate-retaining portion 6a of the housing 6.

A protruding portion 6b is formed on an edge of each front face of the pair of housings 6, 6, and a liquid crystal display panel 1 is disposed so as to span between the front faces of the two housings 6, 6. In addition, a pair of front frames FC are disposed so as to be in contact with the protruding portions 6b of the respective housings 6 and to cover the end faces of the housings 6 and the edges of the liquid crystal display panel 1. This pair of front frames FC constitute a cover portion of the case of the liquid crystal display device 201. Further, a portion of the liquid crystal display panel 1 that is not covered by the front frames constitutes a display screen 1a. The liquid crystal display device 201 further incorporates a driver circuit, which is not shown in the figure, for the liquid crystal display panel 1.

The light sources 2 herein are composed of a fluorescent discharge tube that is driven by high frequency alternating current to emanate light. The light guiding plate 3 is formed of a material such as an acrylic resin that has appropriate optical characteristics represented by transmittance and refractive index that are necessary for light transmission. The reflector sheet 5 is composed of, for example, a film made of a light-reflective white resin. The housings 6 are composed of, for example, a polycarbonate resin. The front frames are made of, for example, a metal.

The liquid crystal display panel 1 is configured so that a pair of transparent substrates on which display electrodes are formed are arranged so as to oppose each other at a predetermined gap, and a liquid crystal is injected between the substrates and is sealed with a sealant.

Next, the operations of the lighting unit and liquid crystal display device 201 thus configured are described below.

When light is emitted from the light source 2, the light passes through the window portion 101 of the light guiding plate-retaining portion 6a of the housing 6 and the window portion 102 of the bend portion 5a of the reflecting sheet 5 either directly or with it being reflected by the reflector 4, and enters an end face of the light guiding plate 3; then, it propagates through the light guiding plate 3 and emanates from its front face. During this process, the light that leaks from the rear face of the light guiding plate 3 is returned into the light guiding plate 3 by the reflecting sheet 5. In addition, scattering dots are provided on the reflecting sheet 5 at densities corresponding to distances from the light source 2, by which the distribution of light intensity emanating from the light guiding plate 3 becomes uniform. The light emanating from the light guiding plate 3 pass through the liquid crystal display panel 1, where its transmittance is controlled by the driver circuit according to image signals, and thereby, an image is displayed on the display screen 1a of the liquid crystal display panel 1. Here, in the present embodiment, since the bend portion 5a of the reflecting sheet 5 is disposed along the outer surface of the light guiding plate-retaining portion 6a of the housing 6, the light scattered into the light guiding plate 3 by the reflecting sheet 5 or the like is reflected toward the light guiding plate 3 by this bend portion 5a, and as a result, it emanates from the front face of the light guiding plate 3. This prevents the brightness unevenness caused by the shadow of the light guiding plate-retaining portion 6a of the housing 6 appearing on the display screen 1a.

It should be noted that in the present embodiment, although the respective light sources 2 are disposed on the opposing end faces of the light guiding plate 3, the respective light sources may be provided on the four end faces or may be disposed on adjoining two end faces in a substantially L-shape. Furthermore, two or more light sources may be disposed.

Moreover, the light guiding plate-retaining portion 6a may be of any shape. For example, it may be in such a shape that it has longitudinal frame portions in its front and rear, or that it has transversal frame portions in its top and bottom.

Embodiment 2

Figure 2:
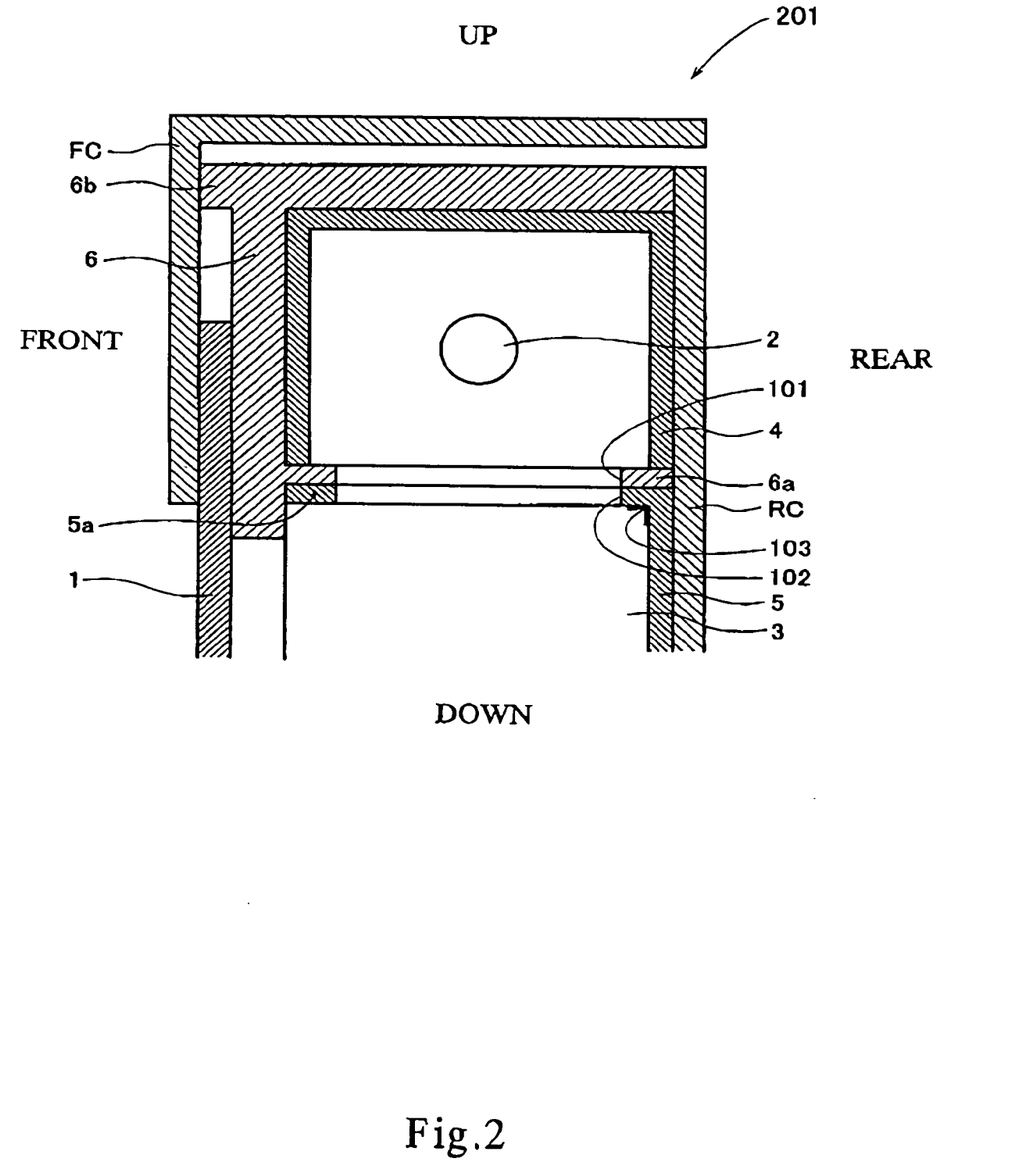
FIG. 2 is a cross-sectional view showing the configuration of a primary portion of a lighting unit and a liquid crystal display device using the same, according to Embodiment 2 of the present invention.

FIG. 2 is a cross-sectional view showing the configuration of a primary portion of a lighting unit and a liquid crystal display device using the same, according to Embodiment 2 of the present invention. In FIG. 2, the same reference characters as those in FIG. 1 denote the same or corresponding parts.

Referring to FIG. 2, in the present embodiment, a bend portion 5a of a reflecting sheet 5 is configured so that the reflectivity of a bend portion 103 is lower than those of the remaining portions. Specifically, the bend portion 103 is formed to be, for example, transparent. Alternatively, the bend portion 103 may be made of a material having a low reflectivity or may be colored with a color having a low reflectivity.

In a liquid crystal display device, specular reflection can occur in the bend portion 103 of the reflecting sheet 5, which may appear as a bright line on the display screen 1a; however, by adopting such a configuration, the reflectivity of the bend portion 103 is lowered, and therefore, display unevenness caused by the bright line can be suppressed.

Embodiment 3

Figure 3:
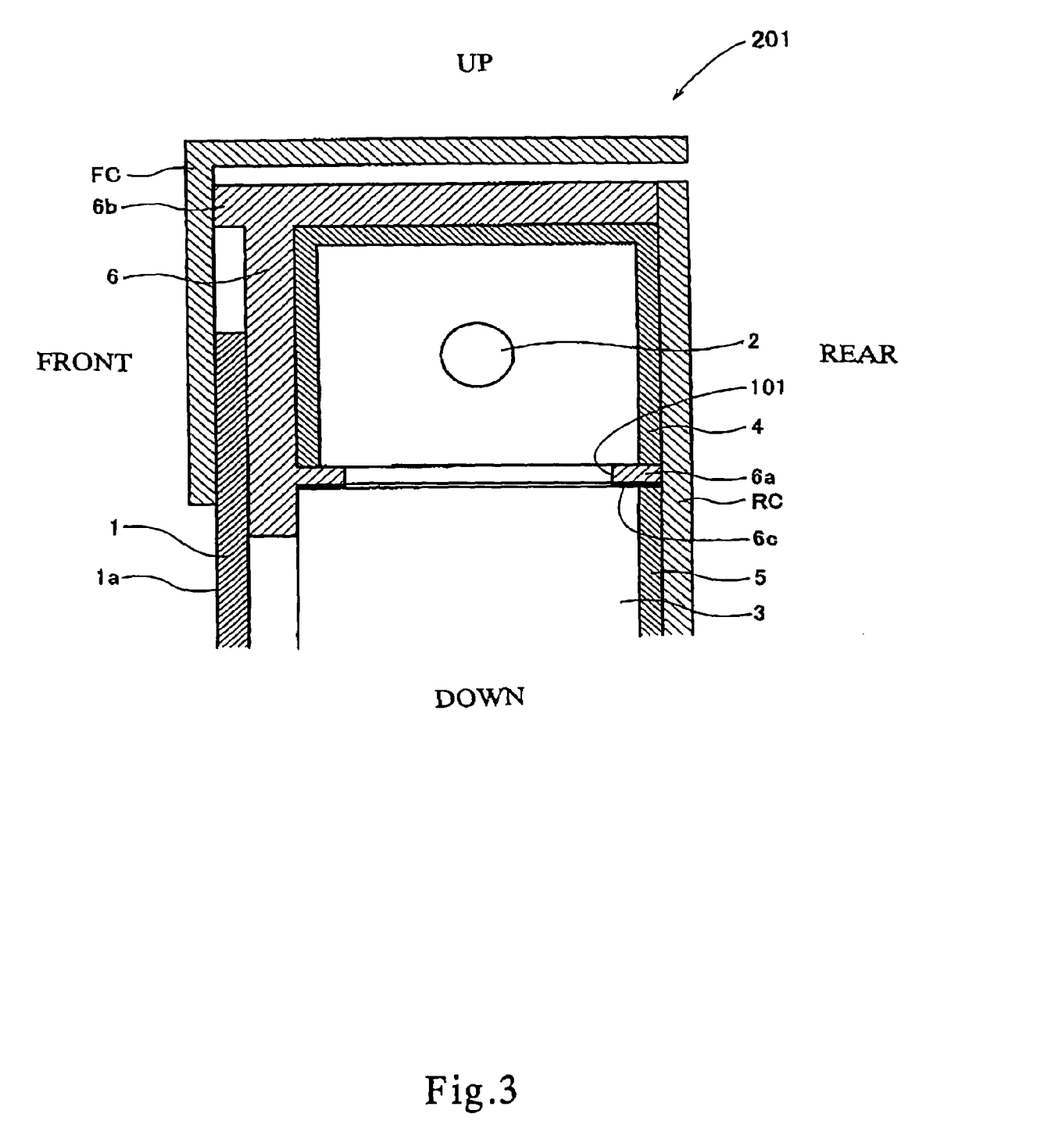
FIG. 3 is a cross-sectional view showing the configuration of a primary portion of a lighting unit and a liquid crystal display device using the same, according to Embodiment 3 of the present invention.

FIG. 3 is a cross-sectional view showing the configuration of a primary portion of a lighting unit and a liquid crystal display device using the same, according to Embodiment 3 of the present invention. In FIG. 3, the same reference characters as those in FIG. 1 denote the same or corresponding parts.

Referring to FIG. 3, in the present embodiment, an outer surface 6c of a light guiding plate-retaining portion 6a of a housing 6 is configured to have a high reflectivity, instead of bending both edge portions of the reflecting sheet 5. For example, the outer surface 6c is colored in white, or a scattering reflecting layer is formed. The rest is similar to Embodiment 1.

By adopting such a configuration as well, the brightness unevenness can be reduced as in Embodiment 1.

Embodiment 4

Figure 4:
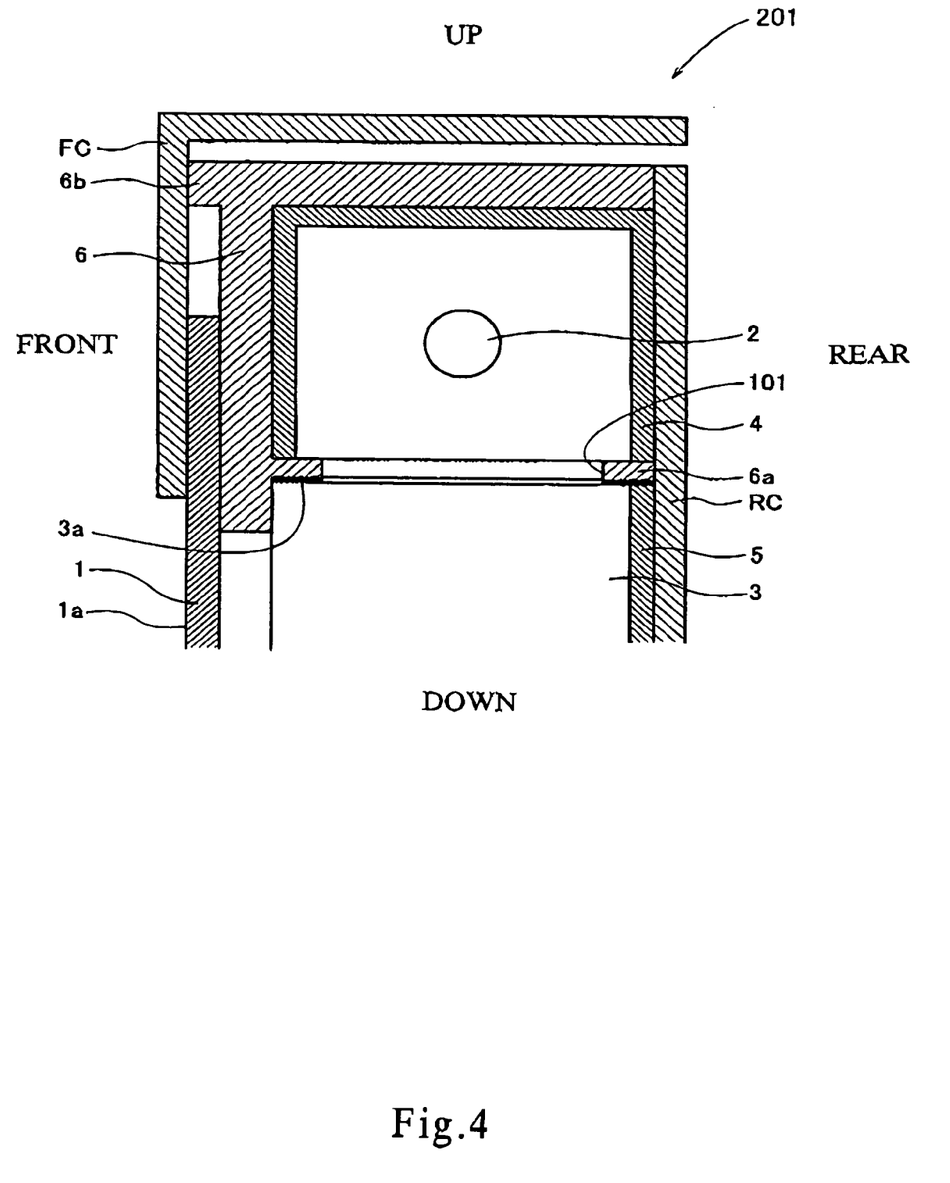
FIG. 4 is a cross-sectional view showing the configuration of a primary portion of a lighting unit and a liquid crystal display device using the same, according to Embodiment 4 of the present invention.

FIG. 4 is a cross-sectional view showing the configuration of a primary portion of a lighting unit and a liquid crystal display device using the same, according to Embodiment 4 of the present invention. In FIG. 4, the same reference characters as those in FIG. 1 denote the same or corresponding parts.

Referring to FIG. 4, in the present embodiment, a portion 3a of an end face of the light guiding plate 3 that is in contact with a light guiding plate-retaining portion 6a of a housing 6 is configured to be capable of reflecting light into the light guiding plate 3, instead of bending both edge portions of the reflecting sheet 5. For example, the portion 3a is colored in white, or a scattering reflecting layer is formed. The rest is similar to Embodiment 1.

By adopting such a configuration as well, the brightness unevenness can be reduced as in Embodiment 1.

From the foregoing description, numerous improvements and other embodiments of the present invention will be readily apparent to those skilled in the art. Accordingly, the foregoing description is to be construed only as examples and as being presented for the purpose of suggesting the best mode for carrying out the invention to those skilled in the art. Modifications may be made in specific structures and/or functions substantially without departing from the sprit of the present invention.

INDUSTRIAL APPLICABILITY

The lighting unit according to the present invention is useful as a lighting unit for thin-type liquid crystal display devices.

The liquid crystal display device according to the present invention is useful as a thin-type display device used for information devices such as notebook-type personal computers and word processors, or as a thin-type display device used for video devices such as portable televisions, camcorders, and vehicle navigation systems.

The invention claimed is:

1. A lighting unit comprising a light guiding plate, a light source disposed so as to face an end face of the light guiding plate, a reflector disposed so as to surround the light source, a housing disposed so as to have a light guiding plate-retaining portion retaining at least the reflector and being partially interposed between the light source and the end face of the light guiding plate to retain the light guiding plate, and a reflecting sheet disposed on one of principal surfaces of the light guiding plate, the lighting unit being configured so that light from the light source enters into the end face of the light guiding plate and goes out from another principal surface of the light guiding plate, characterized in that:
the reflecting sheet is disposed so that an edge thereof is bent so as to be positioned between the light guiding plate-retaining portion of the housing and the end face of the light guiding plate.

2. The lighting unit according to claim 1, wherein the bent portion of the reflecting sheet has a reflectivity lower than the reflectivity of the remaining portions.

3. A lighting unit comprising a light guiding plate, a light source disposed so as to face an end face of the light guiding plate, a reflector disposed so as to surround the light source, a housing disposed so as to have a light guiding plate-retaining portion retaining at least the reflector and being partially interposed between the light source and the end face of the light guiding plate to retain the light guiding plate, and a reflecting sheet disposed on one of principal surfaces of the light guiding plate, the lighting unit being configured so that light from the light source enters into the end face of the light guiding plate and goes out from another principal surface of the light guiding plate, characterized in that:
a surface of the light guiding plate-retaining portion of the housing that faces the end face of the light guiding plate is capable of reflecting incident light.

4. A lighting unit comprising a light guiding plate, a light source disposed so as to face an end face of the light guiding plate, a reflector disposed so as to surround the light source, a housing disposed so as to have a light guiding plate-retaining portion retaining at least the reflector and being partially interposed between the light source and the end face of the light guiding plate to retain the light guiding plate, and a reflecting sheet disposed on one of principal surfaces of the light guiding plate, the lighting unit being configured so that light from the light source enters into the end face of the light guiding plate and goes out from another principal surface of the light guiding plate, characterized in that:
the end face of the light guiding plate that is opposed to the light guiding plate-retaining portion of the housing is capable of reflecting incident light into the light guiding plate.

5. A liquid crystal display device wherein a lighting unit according to any one of claims 1, 3, and 4 is used as a lighting unit for supplying light for display to a liquid crystal panel.

* * * * *